US012781005B2

(12) United States Patent
Takeuchi et al.

(10) Patent No.: US 12,781,005 B2
(45) Date of Patent: Nov. 3, 2026

(54) MONOMER COMPOSITION, MOLDED BODY, BONDED MAGNET, DUST CORE

(71) Applicant: Resonac Corporation, Tokyo (JP)

(72) Inventors: Kazumasa Takeuchi, Tokyo (JP); Teruo Itoh, Tokyo (JP); Arisa Taira, Tokyo (JP); Kosuke Urashima, Tokyo (JP); Hideo Maeda, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 509 days.

(21) Appl. No.: 18/554,334

(22) PCT Filed: Apr. 19, 2021

(86) PCT No.: PCT/JP2021/015883

§ 371 (c)(1),
(2) Date: Oct. 6, 2023

(87) PCT Pub. No.: WO2022/224309

PCT Pub. Date: Oct. 27, 2022

(65) Prior Publication Data

US 2024/0209168 A1 Jun. 27, 2024

(51) Int. Cl.

| | |
|---|---|
| ***C08J 5/24*** | (2006.01) |
| ***C08K 3/28*** | (2006.01) |
| ***C08K 3/38*** | (2006.01) |
| ***C08L 63/00*** | (2006.01) |

(52) U.S. Cl.

CPC ................ *C08J 5/249* (2021.05); *C08K 3/28* (2013.01); *C08K 3/38* (2013.01); *C08L 63/00* (2013.01); *C08K 2201/01* (2013.01)

(58) Field of Classification Search

CPC ... C08J 5/249; C08K 3/28; C08K 3/38; C08K 2201/01; C08K 3/01; C08K 3/08; C08K 3/10; C08L 63/00; C08L 33/00; C08L 33/10; C08F 220/18; H01F 1/057; H01F 1/059; H01F 1/26

See application file for complete search history.

(56) References Cited

U.S. PATENT DOCUMENTS

| | | | | |
|---|---|---|---|---|
| 2016/0362585 | A1* | 12/2016 | Iseda | C09J 9/02 |
| 2017/0227866 | A1* | 8/2017 | Sugahara | G03G 9/08755 |
| 2019/0224747 | A1* | 7/2019 | Yamanaka | B22F 1/102 |
| 2020/0211742 | A1* | 7/2020 | Asada | H01F 1/20 |

FOREIGN PATENT DOCUMENTS

| | | | |
|---|---|---|---|
| JP | H4-027102 | A | 1/1992 |
| JP | 2016-169380 | A | 9/2016 |
| JP | 2019-048948 | A | 3/2019 |
| JP | 2020-085004 | A | 6/2020 |
| JP | 2020-109840 | A | 7/2020 |

* cited by examiner

*Primary Examiner* — Andrew J. Oyer
(74) *Attorney, Agent, or Firm* — FITCH, EVEN, TABIN & FLANNERY, LLP

(57) ABSTRACT

A monomer composition is a monomer composition for impregnating voids in a porous compact. The compact contains a metal powder and a thermosetting resin composition. The monomer composition contains at least one compound selected from the group consisting of an acrylate having a dicyclopentane structure, an acrylate having a dicyclopentene structure, a methacrylate having a dicyclopentane structure, and a methacrylate having a dicyclopentene structure.

10 Claims, 3 Drawing Sheets

MONOMER COMPOSITION, MOLDED BODY, BONDED MAGNET, DUST CORE

CROSS-REFERENCE TO RELATED APPLICATIONS

This application is a U.S. national phase application filed under 35 U.S.C. § 371 of International Application No. PCT/JP2021/015883, filed Apr. 19, 2021, designating the United States, is incorporated herein by reference in its entirety.

TECHNICAL FIELD

One aspect of the present invention relates to a monomer composition, a compact, a bonded magnet, and a dust core.

BACKGROUND ART

As products of powder metallurgy, magnetic members such as bonded magnets, dust cores, and sintered cores, or structural members are produced. In production processes of these members, a compact is formed by molding a metal powder at a high pressure. Since voids are likely to be formed in the metal powder that constitutes the compact, the compact composed of the metal powder is porous. Conventionally, in order to improve the mechanical strength of the compact and add functions to the compact, the voids in the compact are impregnated with a resin.

For example, a method for producing a metal material described in Patent Literature 1 below includes a step of impregnating voids in a porous metal material (sintered body) with a resin. As a result, a metal material excellent in damping function is obtained. A method for producing a bonded magnet described in Patent Literature 2 below includes a step of impregnating voids in a compact made of a magnet powder with an epoxy resin, an acrylate compound, or the like. As a result, detachment and peeling off of the magnet powder in the bonded magnet are suppressed.

CITATION LIST

Patent Literature

Patent Literature 1: Japanese Unexamined Patent Publication No. 2020-85004

Patent Literature 2: Japanese Unexamined Patent Publication No. H4-27102

Patent Literature 3: Japanese Unexamined Patent Publication No. 2019-48948

SUMMARY OF INVENTION

Technical Problem

Compacts (for example, bonded magnets and dust cores) containing a metal powder are required to have environment resistance (for example, a mechanical strength at a high temperature) depending on use applications thereof. In recent years, with the increasing demand for environment resistance, the lack of the mechanical strength of a compact due to voids in the compact has become a technical problem. In the case of conventional bonded magnets and dust cores, the mechanical strength is imparted to a compact by mixing a binder such as a thermosetting resin or a thermoplastic resin with a metal powder. Furthermore, as described above, voids in a compact are impregnated with a resin in order to improve the mechanical strength of a compact.

It is desirable to impregnate the resin efficiently in fine voids in a bonded magnet or a dust core. Furthermore, it is desirable that the resin for impregnation imparts heat resistance (mechanical strength at a high temperature) to a bonded magnet or a dust core. However, there has been no resin for impregnation suitable for a bonded magnet or a dust core. For example, in the case of using a sealing material, such as an acrylic resin or a urethane resin, for impregnation, it has been difficult for a bonded magnet and a dust core to have sufficient heat resistance (mechanical strength at a high temperature).

An object of one aspect of the present invention is to provide a monomer composition that increases the mechanical strength of a porous compact containing a metal powder at a high temperature, a compact, a bonded magnet, and a dust core.

Solution to Problem

A monomer composition according to one aspect of the present invention is a monomer composition for impregnating voids in a porous compact. The compact contains a metal powder and a thermosetting resin composition. The monomer composition contains at least one compound selected from the group consisting of an acrylate having a dicyclopentane structure, an acrylate having a dicyclopentene structure, a methacrylate having a dicyclopentane structure, and a methacrylate having a dicyclopentene structure.

The monomer composition according to one aspect of the present invention may further contain at least one of an acrylate having a glycidyl group and a methacrylate having a glycidyl group.

The monomer composition according to one aspect of the present invention may further contain at least one of an acrylate having a hydroxyl group and a methacrylate having a hydroxyl group.

The thermosetting resin composition may contain at least one functional group selected from the group consisting of a glycidyl group, a hydroxyl group, an amide group, and an imide group.

A compact according to one aspect of the present invention contains a metal powder, a thermosetting resin composition, and a resin having at least one structure of a dicyclopentane structure and a dicyclopentene structure.

The compact according to one aspect of the present invention may further contain an acrylic resin having a glycidyl group.

The compact according to one aspect of the present invention may further contain an acrylic resin having a hydroxyl group.

The resin having at least one structure of the dicyclopentane structure and the dicyclopentene structure may be an acrylic resin.

The resin having at least one structure of the dicyclopentane structure and the dicyclopentene structure may further have at least one functional group of a glycidyl group and a hydroxyl group.

The resin having at least one structure of the dicyclopentane structure and the dicyclopentene structure may have a crosslinked structure including $-CH(OH)-CH_2-$.

The resin having at least one structure of the dicyclopentane structure and the dicyclopentene structure may be bonded to the thermosetting resin composition via the crosslinked structure.

The metal powder may be a permanent magnet or a soft magnetic material.

A bonded magnet according to one aspect of the present invention includes the above-described compact, in which the metal powder contained in the compact is at least one of a Sm—Fe—N-based magnet and a Nd—Fe—B-based magnet.

A dust core according to one aspect of the present invention includes the above-described compact, in which the metal powder contained in the compact is at least one of a pure iron and an alloy containing iron.

Advantageous Effects of Invention

According to one aspect of the present invention, there are provided a monomer composition that increases the mechanical strength of a porous compact containing a metal powder at a high temperature, a compact, a bonded magnet, and a dust core.

DESCRIPTION OF EMBODIMENTS

Figure 1:
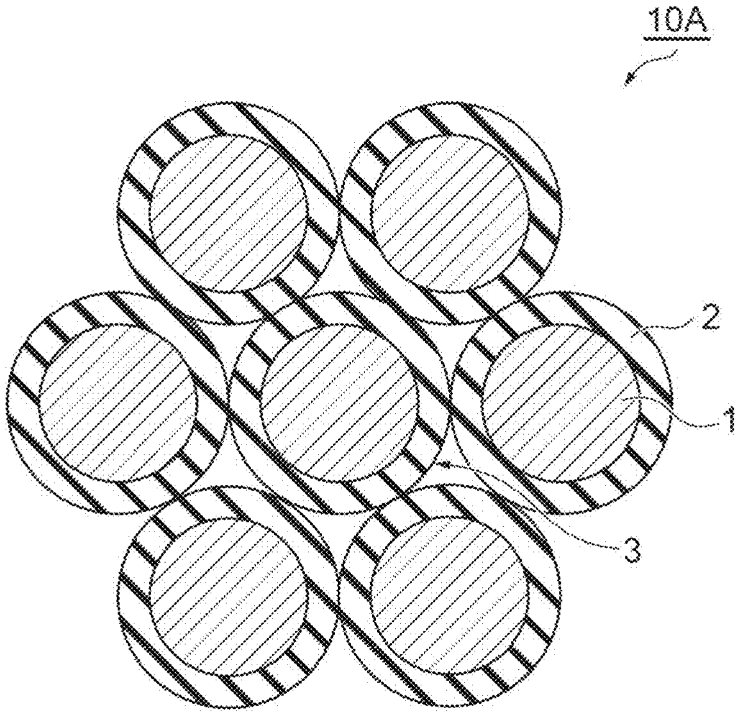
FIG. 1 is a schematic view (cross-sectional view) of a part of a porous compact that is not impregnated with a monomer composition, and a schematic view (cross-sectional view) of a part of a compact that is impregnated with a monomer composition.
Figure 1:
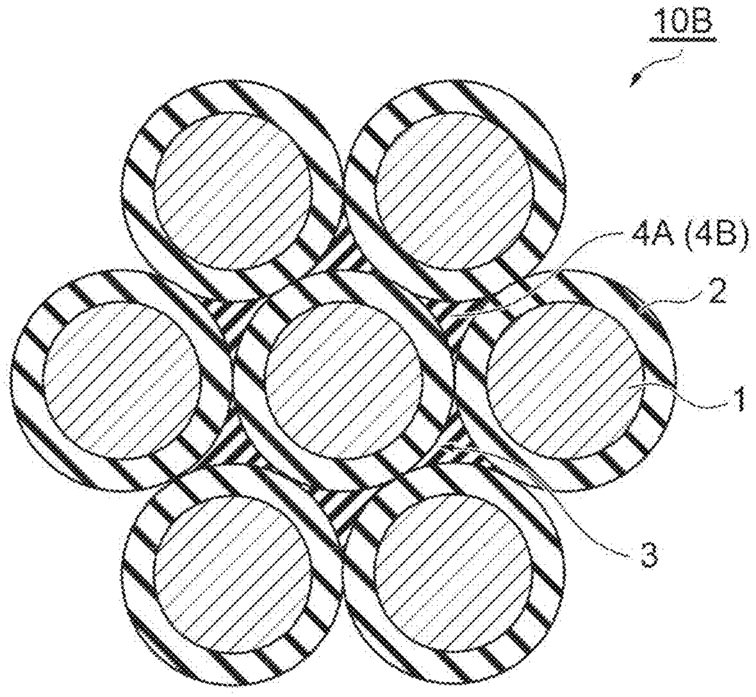

Hereinafter, preferred embodiments of the present invention will be described with reference to the drawings. In the drawings, similar elements are provided with similar reference numerals. The present invention is not limited to the following embodiments. "(Meth)acrylate" described below means either one of an acrylate and a methacrylate, or both an acrylate and a methacrylate. A "(meth)acrylic group" means either one of an acrylic group and a methacrylic group, or both an acrylic group and a methacrylic group.

A monomer composition according to the present embodiment is a monomer composition for impregnating voids in a porous compact. That is, at least some or all of many voids in the compact are filled with the monomer composition. The monomer composition may be liquid at normal temperature. The porous compact contains a metal powder and a thermosetting resin composition. The thermosetting resin composition may be a cured product. A compact that is not impregnated with a monomer composition may consist only of a metal powder and a thermosetting resin composition. A compact 10A in FIG. 1 is a part of a porous compact that is not impregnated with a monomer composition 4A. A compact 10B in FIG. 1 is a part of a compact that is impregnated with the monomer composition 4A. In each compact, a plurality of metal particles 1 constituting the metal powder are bound together by a thermosetting resin composition 2. Some or the entire surface of each metal particle 1 may be covered with the thermosetting resin composition 2. In the compact 10A that is not impregnated with the monomer composition 4A, a plurality of voids 3 are formed. The voids 3 may be rephrased as pores. For example, the voids 3 may be formed between the plurality of metal particles 1 adjacent to each other. One void 3 may be a space surrounded by the thermosetting resin composition 2 covering each metal particle 1. The plurality of voids 3 may communicate with each other. Each void 3 formed inside the compact 10A may communicate with the outside of the compact 10A via the void 3 opened on the surface of the compact 10B. Therefore, the monomer composition 4A may be impregnated in each void 3 formed inside the compact 10A via the void 3 opened on the surface of the compact 10A. For example, the dimensions (pore sizes) of the voids 3 in the compact 10A may be equal to or less than the particle size of the metal powder. For example, the dimensions (pore sizes) of the voids 3 in the compact 10A may be 0.1 μm or more and 100 μm or less. However, the dimensions (pore sizes) of the voids 3 in the compact 10A are not limited.

The monomer composition 4A contains at least one compound selected from the group consisting of an acrylate having a dicyclopentane structure, an acrylate having a dicyclopentene structure, a methacrylate having a dicyclopentane structure, and a methacrylate having a dicyclopentene structure. The dicyclopentane structure is represented by Chemical Formula (1) below. The dicyclopentene structure is represented by Chemical Formula (2) below. The monomer composition 4A may contain plural kinds of (meth)acrylates having a dicyclopentane structure or a dicyclopentene structure. The monomer composition 4A may contain all of an acrylate having a dicyclopentane structure, an acrylate having a dicyclopentene structure, a methacrylate having a dicyclopentane structure, and a methacrylate having a dicyclopentene structure. For convenience of explanation, one or both of the dicyclopentane structure and the dicyclopentene structure are referred to as "cyclic cross linking structure".

[Chemical Formula 1]

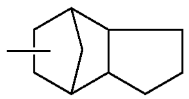

(1)

[Chemical Formula 2]

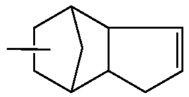

(2)

The monomer composition 4A is polymerized (gelled) by heating. A resin 4B (polymer) having the cyclic cross linking structure(s) is generated by polymerization of the monomer composition 4A containing the above-described (meth)acrylate having the cyclic cross linking structure(s). That is, by heating the compact 10B in which each void 3 is impregnated with the monomer composition 4A, the resin 4B having the cyclic cross linking structure(s) is generated in each void 3, and each void 3 is filled with the resin 4B having the cyclic cross linking structure(s). The resin 4B having the cyclic cross linking structure(s) may be an acrylic resin.

Since the resin 4B having the cyclic cross linking structure(s) tends to have a higher glass transition point (Tg) than other acrylic resins, the compact 10B containing the resin 4B having the cyclic cross linking structure(s) is excellent in heat resistance and can have a high mechanical strength at a high temperature. The mechanical strength of the compact at a high temperature is, for example, the mechanical strength of the compact at a temperature of 100° C. or higher and 200° C. or lower. The cyclic cross linking structure itself does not have to react with other functional groups.

The cyclic cross linking structure(s) in the compact 10B may be detected by the following method.

The powder obtained by pulverizing the compact 10B is added to a solvent having a smaller specific gravity (true specific gravity) than the metal powder in the compact 10B. As a result, the metal powder settles in the solvent, and the component (resin component) of the compact 10B other than the metal powder floats in the solvent. The resin component separated from the metal powder is analyzed by pyrolysis gas chromatography/mass spectrometry to detect the cyclic cross linking structure(s). That is, the resin component separated from the metal powder is decomposed into plural kinds of components with small molecular weights by a decomposing apparatus. The plural kinds of components are separated by gas chromatography, and the component (molecule) corresponding to the cyclic cross linking structure is detected by mass spectrometry of each separated component.

The (meth)acrylate having a cyclic cross linking structure may be at least one (meth)acrylate selected from the group consisting of dicyclopentenyl acrylate (FA-511AS), dicyclopentenyloxyethyl acrylate (FA-512AS), dicyclopentanyl acrylate (FA-513AS), dicyclopentenyl methacrylate (FA-511M), dicyclopentenyloxyethyl methacrylate (FA-512MT), and dicyclopentanyl methacrylate (FA-513M). The notation in parentheses described above is the trade name manufactured by Showa Denko Materials Co., Ltd.

The monomer composition 4A may further contain at least one of an acrylate having a glycidyl group and a methacrylate having a glycidyl group. The monomer composition 4A may further contain at least one of an acrylate having a hydroxyl group and a methacrylate having a hydroxyl group. The monomer composition 4A may further contain both a (meth)acrylate having a glycidyl group and a (meth)acrylate having a hydroxyl group. The resin 4B having a cyclic cross linking structure may be a copolymer formed from a (meth)acrylate having a cyclic cross linking structure and a (meth)acrylate having a glycidyl group. The resin 4B having a cyclic cross linking structure may be a copolymer formed from a (meth)acrylate having a cyclic cross linking structure and a (meth)acrylate having a hydroxyl group. The resin 4B having a cyclic cross linking structure may be a copolymer formed from a (meth)acrylate having a cyclic cross linking structure, a (meth)acrylate having a glycidyl group, and a (meth)acrylate having a hydroxyl group.

Figure 3:
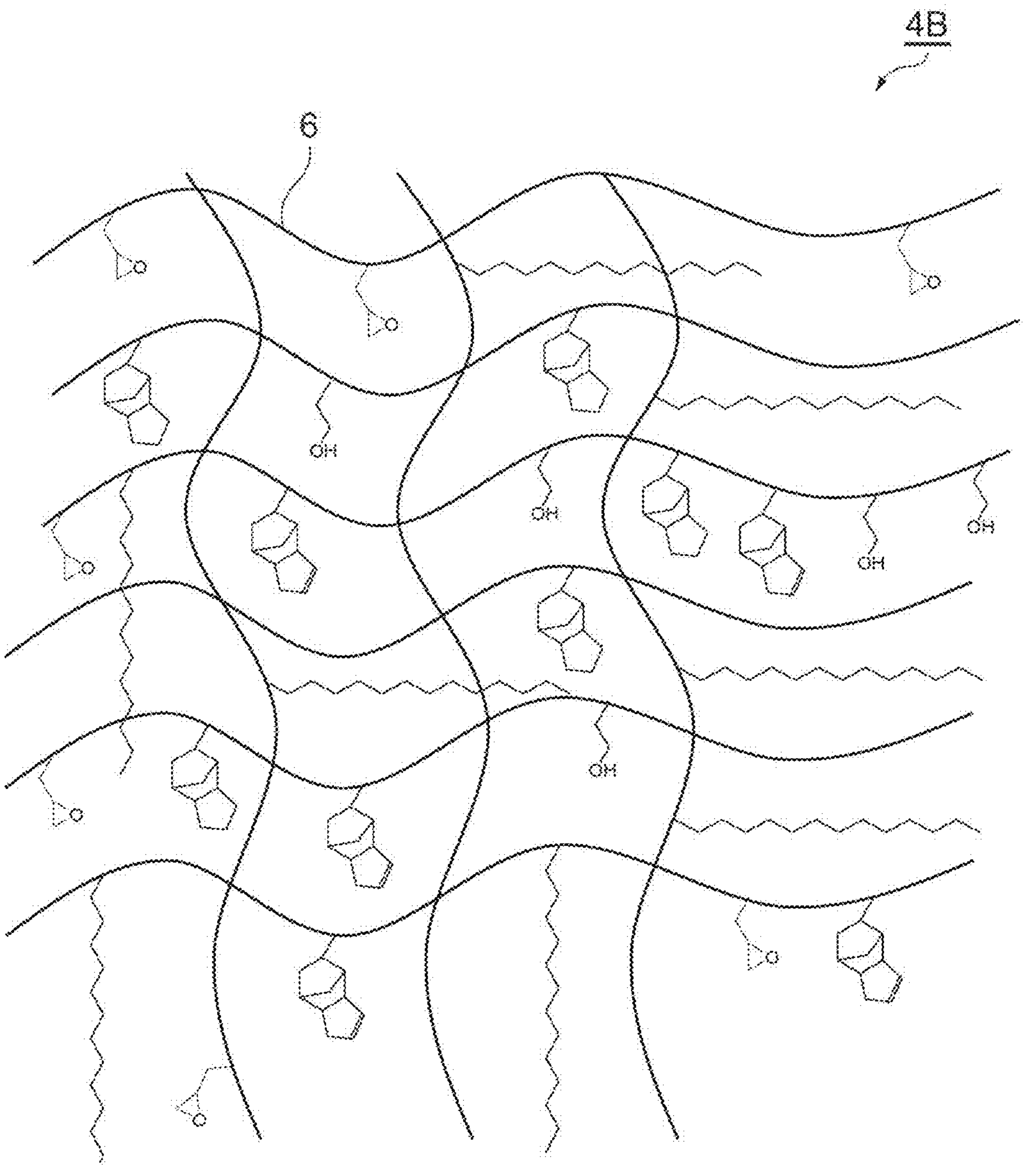
FIG. 3 is a schematic view of a resin (a polymer of a monomer composition) having a dicyclopentane structure, a dicyclopentene structure, a glycidyl group, and a hydroxyl group.

An acrylic resin (crosslinked material) having at least one of a glycidyl group and a hydroxyl group is generated by radical polymerization of the monomer composition 4A. In a case where the monomer composition 4A contains a polyfunctional (meth)acrylate having two or more (meth) acrylic groups, an acrylic resin (crosslinked material) having at least one of a glycidyl group and a hydroxyl group is likely to be generated by radical polymerization. A crosslinking reaction between the glycidyl groups of the acrylic resin may occur by further heating the acrylic resin generated by radical polymerization. A crosslinking reaction between the glycidyl group of the acrylic resin and the hydroxyl group of the acrylic resin may occur by further heating the acrylic resin generated by radical polymerization. As illustrated in FIG. 3, the above-described crosslinking reaction allows the resin 4B having a cyclic cross linking structure to have a strong structure composed of acrylic resins 6 crosslinked to each other in a network form. That is, the resin 4B having a cyclic cross linking structure can further have a crosslinked structure including —CH(OH)—$CH_2$— (a crosslinked structure derived from a glycidyl group). As a result, the heat resistance of the compact 10B is likely to be improved, and the mechanical strength of the compact 10B at a high temperature is likely to be increased.

At least one of the glycidyl group and the hydroxyl group in the acrylic resin may react with a functional group in the thermosetting resin composition by heating the acrylic resin generated by radical polymerization and the thermosetting resin composition. As a result, a crosslinked structure may be formed between the acrylic resin and the thermosetting resin composition.

A part of the glycidyl group of the (meth)acrylate may remain in the compact 10B without reacting with other functional groups. That is, the compact 10B may further contain an acrylic resin having a glycidyl group. A part of the hydroxyl group of the (meth)acrylate may remain in the compact 10B without reacting with other functional groups. That is, the compact 10B may further contain an acrylic resin having a hydroxyl group. The resin 4B having a cyclic cross linking structure may further have at least one functional group of a glycidyl group and a hydroxyl group.

The (meth)acrylate having a glycidyl group may be, for example, at least one (meth)acrylate of glycidyl methacrylate and glycidyl acrylate.

The (meth)acrylate having a hydroxyl group may be, for example, at least one (meth)acrylate of 2-hydroxyethyl acrylate and 2-hydroxymethyl acrylate.

Figure 2:
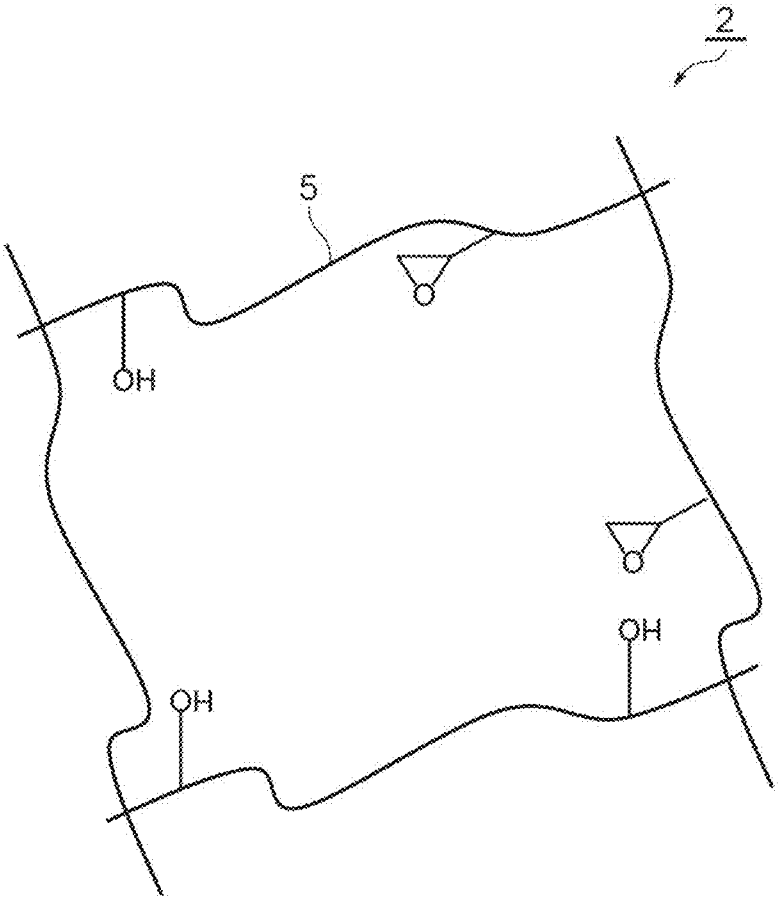
FIG. 2 is a schematic view of a thermosetting resin composition 2 (cured product) contained in a compact.

Before the compact 10A is impregnated with the monomer composition 4A, the thermosetting resin composition 2 in the compact 10A may contain at least one functional group selected from the group consisting of an epoxy group, a glycidyl group, a hydroxyl group, an amino group, an amide group, an imide group, a carboxy group, and an acid anhydride group (—(C═O)—O—(C═O)—). For example, the epoxy group and the glycidyl group may be derived from an epoxy resin. For example, the hydroxyl group may be derived from at least one of an epoxy resin and a phenolic resin. As illustrated in FIG. 2, the thermosetting resin composition 2 may be composed of epoxy resins 5 crosslinked to each other in a network form, and may contain an unreacted glycidyl group and an unreacted hydroxyl group that remain after crosslinking (heat curing). For example, the amide group may be derived from at least one of a polyamide resin and a polyamideimide resin. For example, the imide group may be derived from at least one of a polyimide resin, a polyamideimide resin, and a bismaleimide resin.

With the polymerization of the monomer composition 4A, the glycidyl group contained in the monomer composition 4A or in its polymer may react with the above functional groups contained in the thermosetting resin composition 2 to form a crosslinked structure including —CH(OH)—$CH_2$—. With the polymerization of the monomer composition 4A, the hydroxyl group contained in the monomer composition 4A or in its polymer may react with the glycidyl group contained in the thermosetting resin composition 2 to form a crosslinked structure including —CH(OH)—$CH_2$—. That is, the resin 4B having a cyclic cross linking structure may be bonded to (integrated with) the thermosetting resin composition 2 via the crosslinked structure including —CH (OH)—$CH_2$—. As a result, the heat resistance of the compact 10B is likely to be improved, and the mechanical strength of the compact 10B at a high temperature is likely to be increased.

Since the monomer composition 4A is easily impregnated in the voids 3, the monomer composition 4A may further contain a low-viscosity (meth)acrylate. For example, the low-viscosity (meth)acrylate may be at least one (meth) acrylate selected from the group consisting of stearyl acrylate, methoxytriethylene glycol acrylate, methoxypolyethylene glycol acrylate (methoxypolyethylene glycol #400 acrylate), methoxytripropylene glycol acrylate, phenoxydiethylene glycol acrylate, lauryl methacrylate, and benzyl methacrylate (FA-BZM, trade name, manufactured by Showa Denko Materials Co., Ltd.).

Since the crosslinked structure is likely to be formed with the polymerization of the monomer composition 4A, the monomer composition 4A may further contain a polyfunctional (meth)acrylate having two or more (meth)acrylic groups. For example, the polyfunctional (meth)acrylate may be at least one (meth)acrylate selected from the group consisting of pentaerythritol tetraacrylate, 1,4-butanediol dimethacrylate, neopentyl dimethacrylate, methoxydiethylene glycol dimethacrylate, methoxytetraethylene glycol dimethacrylate, and methoxydiethylene glycol dimethacrylate.

For the reason that the compact 10B is likely to have softness (flexibility), the monomer composition 4A may further contain a (meth)acrylate having a relatively long alkyl chain. For example, the (meth)acrylate having an alkyl chain may be at least one (meth)acrylate selected from the group consisting of lauryl methacrylate and dodecyl methacrylate.

In order to polymerize (gel) the monomer composition 4A by heating, the monomer composition 4A may contain a thermal-radical polymerization initiator. For example, the thermal-radical polymerization initiator may be at least one compound selected from the group consisting of an azo compound and a peroxide. The thermal-radical polymerization initiator may be preferably an organic peroxide since it does not generate gas when thermal radicals are generated. An organic peroxide that dissolves in (meth)acrylate (monomer) can be used. The organic peroxide may be preferably liquid at normal temperature. For example, the organic peroxide may be at least one compound selected from the group consisting of benzoyl peroxide, t-butylperoxy-2-ethylhexanoate (PERBUTYL O, trade name, manufactured by NOF CORPORATION), and lauryl peroxide.

For example, the monomer composition 4A may be prepared by mixing a (meth)acrylate having a cyclic cross linking structure, a low-viscosity (meth)acrylate, a polyfunctional (meth)acrylate, and a thermal-radical polymerization initiator. The thermal-radical polymerization initiator may be blended in the monomer composition 4A immediately before the compact 10A is impregnated with the monomer composition 4A.

The total mass of all (meth)acrylates contained in the monomer composition 4A may be expressed as 100 parts by mass, and the mass ratio of the thermal-radical initiator with respect to 100 parts by mass of the (meth)acrylate may be 0.1 parts by mass or more and 5 parts by mass or less and preferably 1 part by mass or more and 2 parts by mass or less.

The viscosity of the monomer composition 4A may be adjusted based on the composition and mixing ratio of each of the plural kinds of (meth)acrylates constituting the monomer composition 4A. The viscosity of the monomer composition 4A at 25° C. may be preferably 1 mPa·s or more and 200 mPa·s or less, more preferably 10 mPa·s or more and 100 mPa·s or less, and most preferably 20 mPa·s or more and 90 mPa·s or less. Since the monomer composition 4A has a relatively low viscosity as described above, the fine voids 3 in the compact 10A can be easily impregnated with the monomer composition 4A.

The monomer composition 4A may be impregnated in the voids 3 in the porous compact 10A by the following method. The entire porous compact 10A is immersed in the monomer composition 4A placed in a container capable of reducing the pressure inside thereof. The gas filling the voids in the compact 10A is removed to the outside of the compact 10A by the subsequent depressurization in the container. After the gas is removed from the compact 10A, the pressure in the container is returned to the atmospheric pressure. The monomer composition 4A is impregnated in the voids 3 of the porous compact 10A by the above method. The number of times of reducing the pressure in the container and releasing the pressure to the atmospheric pressure may be one. Reducing the pressure in the container and releasing the pressure to the atmospheric pressure may be alternately repeated more than once.

The thermal polymerization of the monomer composition 4A (generation of the resin 4B having a cyclic cross linking structure), the crosslinking reaction in the resin 4B having a cyclic cross linking structure, and the crosslinking reaction between the resin 4B having a cyclic cross linking structure and the thermosetting resin composition 2 may occur by a first heating treatment of the compact 10B that is impregnated with the monomer composition 4A. The temperature of the first heating treatment of the compact 10B may be substantially equal to a decomposition temperature of the thermal-radical polymerization initiator in the monomer composition 4A. The temperature and required time for the first heating treatment of the compact 10B differ depending on the composition of the thermal-radical polymerization initiator. For example, the temperature of the first heating treatment of the compact 10B may be 40° C. or higher and 120° C. or lower, preferably 60° C. or higher and 110° C. or lower, and more preferably 80° C. or higher and 100° C. or lower. The required time for the first heating treatment of the compact 10B may be 30 minutes or longer and preferably 1 hour or longer.

In a case where the monomer composition 4A contains at least one of a (meth)acrylate having a glycidyl group and a (meth)acrylate having a hydroxyl group, a second heating treatment of the compact 10B may be performed after the above-described first heating treatment. The temperature of the second heating treatment of the compact 10B may be 150° C. or higher and 210° C. or lower, and preferably 180° C. or higher and 200° C. or lower. The required time for the second heating treatment of the compact 10B may be 10 minutes or longer and 60 minutes or shorter. The mechanical strength of the compact 10B can be further increased by the second heating treatment of the compact 10B.

An impregnation amount Rm of the monomer composition 4A defined by Mathematical Formula 1 below may be 0.1% by mass or more and 5.0% by mass or less, or 0.57% by mass or more and 1.3% by mass or less. $M_B$ in Mathematical Formula 1 is the mass of the compact 10B that is impregnated with the monomer composition 4A. $M_B$ may be rephrased as the mass of the compact 10B containing the resin 4B having a cyclic cross linking structure. $M_A$ in Mathematical Formula 1 is the mass of the porous compact 10A before being impregnated with the monomer composition 4A. In a case where the impregnation amount of the monomer composition 4A is within the above range, the magnetic or soft magnetic properties of the compact 10B and the mechanical strength of the compact 10B at a high temperature are likely to be compatible.

$$Rm=(M_B-M_A)-M_B\times 100 \quad (1)$$

The metal powder may be a permanent magnet. For example, the permanent magnet may be a samarium-cobalt (Sm—Co)-based alloy magnet, a neodymium-iron-boron (Nd—Fe—B)-based alloy magnet, a samarium-iron-nitrogen (Sm—Fe—N)-based alloy magnet, an iron-cobalt (Fe—Co)-based alloy magnet, or an Al—Ni—Co-based alloy magnet (alnico magnet). In a case where the metal powder is a permanent magnet, the particle size of the metal powder may be, for example, 20 μm or more and 300 μm or less, or 40 μm or more and 250 μm or less.

A bonded magnet according to the present embodiment may be the compact 10B containing a powder of the permanent magnet (for example, at least one of a Sm—Fe—N-based magnet and a Nd—Fe—B-based magnet), the thermosetting resin composition 2, and the resin 4B having a cyclic cross linking structure.

The metal powder may be a soft magnetic material. The metal powder, which is a soft magnetic material, may be, for example, at least one metal selected from the group consisting of a pure iron and an alloy containing iron. The alloy containing iron may be, for example, at least one metal selected from the group consisting of an Fe—Cr-based alloy (stainless steel), an Fe—Ni—Cr-based alloy (stainless steel), an Fe—Si-based alloy, an Fe—Si—Al-based alloy (sendust), an Fe—Ni-based alloy (permalloy), an Fe—Cu—Ni-based alloy (permalloy), an Fe—Co-based alloy (permendur), an Fe—Cr—Si-based alloy (electromagnetic stainless steel), and an Fe—Ni—Mn—C-based alloy (invar). The metal powder, which is a soft magnetic material, may be amorphous. The metal powder, which is a soft magnetic material, may be an Fe amorphous alloy. The metal powder, which is a soft magnetic material, may be at least one of an amorphous iron powder and a carbonyl iron powder. In a case where the metal powder is a soft magnetic material, the particle size of the metal powder may be, for example, 60 μm or more and 150 μm or less.

A dust core according to the present embodiment may be the compact 10B containing a powder of the above-described soft magnetic material (for example, at least one of a pure iron and an alloy containing iron), the thermosetting resin composition 2, and the resin 4B having a cyclic cross linking structure. The dust core may be used, for example, in inductors, transformers, reactors, thyristor valves, noise filters (EMI filters), choke coils, iron cores for motors, rotors and yokes of motors for general home appliances and industrial equipment, solenoid cores (stationary iron cores) for electromagnetic valves incorporated in electronically controlled fuel injection apparatus of diesel engines and gasoline engines, position sensors, and magnetostrictive sensors.

The metal powder may contain plural kinds of metal elements. For example, the metal powder may further contain at least one element selected from the group consisting of a base metal element, a noble metal element, a transition metal element, and a rare earth element, in addition to the above-described elements. For example, the metal powder may further contain at least one element selected from the group consisting of copper (Cu), titanium (Ti), manganese (Mn), cobalt (Co), nickel (Ni), zinc (Zn), aluminum (Al), tin (Sn), chromium (Cr), barium (Ba), strontium (Sr), lead (Pb), silver (Ag), oxygen (O), beryllium (Be), phosphorus (P), boron (B), and silicon (Si).

The compact 10A (compact 10B) may contain one kind of metal powder, or may contain plural kinds of metal powders. For example, the compact 10A (compact 10B) may contain plural kinds of metal powders that differ in average particle size or median diameter (D50). The shape of each of the metal particles 1 constituting the metal powder is not particularly limited. Each of the metal particles 1 may be, for example, spherical, flattened, or acicular. The particle size of the metal powder may be calculated based on weight measurement of the metal particles by sieving. The particle size of the metal powder may be measured by a laser diffraction particle size distribution measuring apparatus. The compact 10A (compact 10B) may further contain an inorganic filler (for example, silica ($SiO_2$) particles) in addition to the above-described metal powder.

The thermosetting resin composition 2 may contain at least one thermosetting resin selected from the group consisting of an epoxy resin, a phenolic resin, a bismaleimide resin, a polyimide resin, and a polyamideimide resin. The thermosetting resin composition 2 may further contain a polyamide resin (thermoplastic resin) in addition to the above-described thermosetting resin. The functional group contained in the thermosetting resin may react with any one of the glycidyl group and the hydroxyl group of the resin 4B having a cyclic cross linking structure to form a crosslinked structure ($—CH(OH)—CH_2—$). For example, at least one thermosetting resin selected from the group consisting of an epoxy resin, a phenolic resin, a bismaleimide resin, a polyimide resin, and a polyamideimide resin may have at least one functional group of a glycidyl group and a hydroxyl group. The glycidyl group of the thermosetting resin may react with any one of the glycidyl group and the hydroxyl group of the resin 4B having a cyclic cross linking structure to form a crosslinked structure ($—CH(OH)—CH_2—$). The hydroxyl group of the thermosetting resin may also react with the glycidyl group of the resin 4B having a cyclic cross linking structure to form a crosslinked structure ($—CH(OH)—CH_2—$). The mechanical strength of the compact 10B at a high temperature is likely to be further increased by the crosslinked structure between the resin 4B having a cyclic cross linking structure and the thermosetting resin. For the same reason, the functional group (for example, an amide group) of the polyamide resin in the thermosetting resin composition 2 may react with the glycidyl group of the resin 4B having a cyclic cross linking structure to form a crosslinked structure ($—CH(OH)—CH_2—$).

For example, the epoxy resin may be at least one resin selected from the group consisting of a biphenyl-type epoxy resin, a stilbene-type epoxy resin, a diphenylmethane-type epoxy resin, a sulfur atom-containing epoxy resin, a novolac-type epoxy resin, a dicyclopentadiene-type epoxy resin, a salicylaldehyde-type epoxy resin, a copolymer-type epoxy resin of naphthols and phenols, an epoxide of an aralkyl-type phenolic resin, a bisphenol-type epoxy resin, a glycidyl ether-type epoxy resin of alcohols, a glycidyl ether-type epoxy resin of a para-xylylene and/or meta-xylylene-modified phenolic resin, a glycidyl ether-type epoxy resin of a terpene-modified phenolic resin, a cyclopentadiene-type epoxy resin, a glycidyl ether-type epoxy resin of a polycyclic aromatic ring-modified phenolic resin, a glycidyl ether-type epoxy resin of a naphthalene ring-containing phenolic resin, a glycidyl ester-type epoxy resin, a glycidyl-type or methylglycidyl-type epoxy resin, an alicyclic-type epoxy resin, a halogenated phenol novolac-type epoxy resin, an ortho-cresol novolac-type epoxy resin, a hydroquinone-type epoxy resin, a thioether-type epoxy resin, a trimethylolpropane-type epoxy resin, and a linear aliphatic epoxy resin obtained by oxidation of an olefin bond with a peracid such as peracetic acid.

For example, the phenolic resin may be at least one resin selected from the group consisting of an aralkyl-type phenolic resin, a dicyclopentadiene-type phenolic resin, a salicylaldehyde-type phenolic resin, a novolac-type phenolic resin, a copolymer-type phenolic resin of benzaldehyde-type phenol and aralkyl-type phenol, a para-xylylene and/or meta-xylylene-modified phenolic resin, a melamine-modified phenolic resin, a terpene-modified phenolic resin, a dicyclopentadiene-type naphthol resin, a cyclopentadiene-modified phenolic resin, a polycyclic aromatic ring-modified phenolic resin, a biphenyl-type phenolic resin, and a triphenylmethane-type phenolic resin. The phenolic resin may be a copolymer composed of two or more kinds of the above-described resin. The phenolic resin may be contained as a curing agent in the thermosetting resin composition 2 together with the epoxy resin.

A phenolic novolac resin (novolac-type phenolic resin) may be a resin obtained by, for example, condensation or co-condensation of phenols and/or naphthols and aldehydes in the presence of an acidic catalyst. The phenols constituting the phenolic novolac resin may be, for example, at least one selected from the group consisting of phenol, cresol, xylenol, resorcinol, catechol, bisphenol A, bisphenol F, biphenol, phenylphenol, and aminophenol. The naphthols constituting the phenolic novolac resin may be, for example, at least one selected from the group consisting of α-naphthol, β-naphthol, and dihydroxynaphthalene. The aldehydes constituting the phenolic novolac resin may be, for example, at least one selected from the group consisting of formaldehyde, acetaldehyde, propionaldehyde, benzaldehyde, and salicylaldehyde.

The phenols constituting the phenolic novolac resin may be a compound having two phenolic hydroxyl groups in one molecule. The compound having two phenolic hydroxyl groups in one molecule may be, for example, at least one selected from the group consisting of resorcinol, catechol, bisphenol A, bisphenol F, and a substituted or unsubstituted biphenol.

A ratio of a hydroxyl equivalent of the phenolic resin with respect to an epoxy equivalent of the epoxy resin may be 0.5 or more and 1.5 or less, 0.9 or more and 1.4 or less, 1.0 or more and 1.4 or less, or 1.0 or more and 1.2 or less. That is, a ratio of an active group (phenolic OH group) in the phenolic resin that reacts with the epoxy group in the epoxy resin may be preferably 0.5 equivalents or more and 1.5 equivalents or less, more preferably 0.9 equivalents or more and 1.4 equivalents or less, further preferably 1.0 equivalent or more and 1.4 equivalents or less, and particularly preferably 1.0 equivalent or more and 1.2 equivalents or less, with respect to 1 equivalent of the epoxy group in the epoxy resin.

For example, the bismaleimide resin may contain an addition reaction product of polymaleimides (a) and aminophenols (b), and an epoxy compound (c). The addition reaction product may be obtained by the reaction between the polymaleimides (a) and the aminophenols (b), and the bismaleimide resin may be obtained by adding the epoxy compound (c) to the addition reaction product.

The polymaleimides (a) constituting the bismaleimide resin are represented by Chemical Formula (A) below.

[Chemical Formula 3]

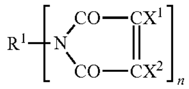

(A)

$R^1$ in Chemical Formula (A) is an n-valent organic group. Each of $X^1$ and $X^2$ is a monovalent atom selected from hydrogen or halogen, or a monovalent organic group. $X^1$ and $X^2$ may be the same, and $X^1$ and $X^2$ may be different from each other. n in Chemical Formula (A) is an integer of 2 or more.

The polymaleimides (a) may be, for example, at least one compound selected from the group consisting of ethylenebismaleimide, hexamethylenebismaleimide, m-phenylenebismaleimide, p-phenylenebismaleimide, 4,4'-diphenylmethanebismaleimide, 4,4'-diphenyletherbismaleimide, 4,4'-diphenylsulfonebismaleimide, 4,4'-dicyclohexylmethanebismaleimide, m-xylylenebismaleimide, p-xylylenebismaleimide, and 4,4'-phenylenebismaleimide. If necessary, the above-described polymaleimides (a) and monomaleimides may be contained in the bismaleimide resin. The monomaleimides may be, for example, N-3-chlorophenylmaleimide or N-4-nitrophenylmaleimide.

The aminophenols (b) constituting the bismaleimide resin are represented by Chemical Formula (B) below.

[Chemical Formula 4]

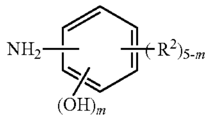

(B)

$R^2$ in Chemical Formula (B) is a monovalent atom selected from hydrogen or halogen, or a monovalent organic group. m in Chemical Formula (B) is an integer of 1 to 5.

The aminophenols (b) may be at least one compound selected from the group consisting of o-aminophenol, m-aminophenol, p-aminophenol, o-aminocresol, m-aminocresol, p-aminocresol, aminoxylenol, aminochlorophenol, aminobromophenol, aminocatechol, aminoresorcin, aminobis(hydroxyphenol)propane, and aminooxybenzoic acid.

The epoxy compound (c) constituting the bismaleimide resin has two or more epoxy groups in its molecule. The epoxy compound (c) may be, for example, at least one compound selected from the group consisting of a bisphenol A-type epoxy resin, a bisphenol F-type epoxy resin, a novolac-type epoxy resin, a glycidyl ester resin of polycarboxylic acid, a polyglycidyl ether of polyol, a urethane-modified epoxy resin, a fatty acid-type polyepoxide obtained by epoxidizing an unsaturated compound, an alicyclic polyepoxide obtained epoxidizing an unsaturated compound, an epoxy resin having a heterocyclic ring, an epoxy resin having a different node ring, and an epoxy resin obtained by glycidylating amine.

The addition reaction product is obtained by the reaction between the polymaleimides (a) and the aminophenols (b) described above. The mass ratio of the aminophenols (b) may be 5 to 40 parts by mass and preferably 10 to 30 parts by mass with respect to 100 parts by mass of the polymaleimides (a). The reaction temperature of the polymaleimides (a) and the aminophenols (b) may be, for example, 50 to 200° C. and preferably 80 to 180° C. The reaction time of the polymaleimides (a) and the aminophenols (b) may be appropriately adjusted within a range of several minutes to several tens of hours.

The content of the addition reaction product in the bismaleimide resin may be 30 to 80% by mass.

The bismaleimide resin may be, for example, at least one resin selected from KIR-30, KIR-50, and KIR-100 (all of these are trade names manufactured by KYOCERA Corporation).

For example, the polyimide resin may be a dehydration polycondensate of a tetracarboxylic anhydride and 4,4'-bis (3-aminophenoxy)biphenyl. The polyimide resin may be at least one resin selected from AURUM PL450C, AURUM PL500A, AURUM PL6200, AURUM PD450L (all of these are products manufactured by Mitsui Chemicals, Inc.), SolverPI-5600 (product manufactured by Solver polyimide Company), and Therplim (product manufactured by MITSUBISHI GAS CHEMICAL COMPANY, INC.).

For example, the polyamide resin may be at least one of particles of nylon 6 obtained by F-caprolactam and particles of nylon 12 obtained from lauryl lactam. For example, the polyamide resin may be at least one resin selected from the group consisting of particles composed of nylon 6 (TR-1 and TR-2 manufactured by Toray Industries, Inc.) and particles composed of nylon 12 (SP-500 and SP-10 manufactured by Toray Industries, Inc.).

For example, the polyamideimide resin may be a polyamideimide resin having a siloxane structure. The polyamideimide resin may have two or more carboxy groups at at least one terminal of both terminals of the polyamideimide molecular chain. The carboxy group of the polyamideimide resin may react with the glycidyl group contained in the monomer composition 4A or its polymer to form a cross-linked structure including $—CH(OH)—CH_2—$. The polyamideimide resin may be the polyamideimide resin described in Japanese Unexamined Patent Publication No. 2019-48948. The thermosetting resin composition 2 may contain the aforementioned plural kinds of thermosetting resins. The thermosetting resin composition 2 may further contain other resins (for example, a thermoplastic resin) in addition to the above-described thermosetting resin. For example, the thermosetting resin composition 2 may further contain at least one other resin selected from the group consisting of a polyphenylene sulfide resin, an acrylic resin, polyethylene, polypropylene, polystyrene, polyvinyl chloride, polyethylene terephthalate, and a silicone resin.

The thermosetting resin composition 2 may further contain at least one compound selected from the group consisting of a curing agent, a coupling agent (for example, a silane coupling agent), and an additive, in addition to the above-described thermosetting resin. The additive may be, for example, at least one compound selected from the group consisting of a curing accelerator (curing catalyst), a flame retardant, a wax (lubricant), and an organic solvent.

The content of the metal powder in the compact 10A (compact 10B) may be 95% by mass or more and 99.5% by mass or less and more preferably 96% by mass or more and 99% by mass or less with respect to total mass (100% by mass) of the metal powder and the thermosetting resin composition 2. In a case where the content of the metal powder is within the above range, the magnetic or soft magnetic properties of the compact 10B and the mechanical strength of the compact 10B at a high temperature are likely to be compatible.

The porous compact 10A (the compact 10A before being impregnated with the monomer composition 4A) may be produced by the following method.

A solution of the thermosetting resin composition is obtained by dissolving raw materials of the thermosetting resin composition described above in an organic solvent. The organic solvent may be, for example, at least one solvent selected from the group consisting of acetone, methyl ethyl ketone, methyl isobutyl ketone, benzene, toluene, xylene, and the like. The metal powder is added to the solution of the thermosetting resin composition to disperse the metal powder in the solution of the thermosetting resin composition. The organic solvent is removed from the solution containing the metal powder and the thermosetting resin composition by vacuum distillation and drying of the solution containing the metal powder and the thermosetting resin composition. As a result, the surfaces of individual metal particles constituting the metal powder are coated with the thermosetting resin composition to obtain a compound (powder) containing the metal powder and the thermosetting resin composition. In the case of producing a compound containing an inorganic filler, the inorganic filler may be added to the solution of the thermosetting resin composition together with the metal powder. A surface treatment of each of the metal powder and the inorganic filler with a coupling agent may be performed in advance. A lubricant such as a saturated fatty acid salt may be added to the compound.

In a step of removing the organic solvent from the solution containing the metal powder and the thermosetting resin composition, it is preferable to perform vacuum distillation of the organic solvent at normal temperature using an evaporator while stirring the solution. A compound may be obtained by further drying the solid matter obtained by vacuum distillation using a vacuum dryer or the like, and then pulverizing the solid matter as appropriate. Instead of vacuum distillation, atmospheric distillation may be performed while stirring the solution with a kneader or the like. Heating is not preferable as a drying method of the solid matter obtained by distillation. However, the solid matter may be dried by heating the solid matter at 80° C. or lower and preferably 60° C. or lower.

Although a solvent is used in the aforementioned production method of the compound, the compound may be prepared without using a solvent. That is, the compound may be prepared by dry mixing without using a solvent. For example, the metal powder and the thermosetting resin composition may be mixed in an airtight container at normal temperature and normal pressure.

A compact is obtained by compression molding of the compound filled in a mold. The molding pressure may be, for example, 500 MPa or more and 2500 MPa or less, or 700 MPa or more and 2000 MPa or less. The density of the compact may be preferably 75% or more and 90% or less and more preferably 80% or more and 90% or less, with respect to the true density of the metal powder. In a case where the density of the compact within the above range with respect to the true density of the metal powder, the magnetic or soft magnetic properties of the compact and the mechanical strength of the compact at a high temperature are likely to be improved.

The thermosetting resin composition in the compact may be cured by a thermal treatment of the compact. Since the metal particles in the compact are bound together by a cured product of the thermosetting resin composition, a compact having a high mechanical strength is easily obtained. The thermal treatment temperature of the compact may be a temperature at which the thermosetting resin composition is sufficiently cured. The thermal treatment temperature of the compact may be, for example, 150° C. or higher and 450° C. or lower, and preferably 200° C. or higher and 350° C. or lower. The atmosphere of the thermal treatment may be air (preferably, dry air) or an inert atmosphere (for example, nitrogen). In order to suppress oxidation of the metal powder in the compact, it is preferable to perform the thermal treatment of the compact in an inert atmosphere. In a case where the thermal treatment temperature is too high, the metal powder is likely to be oxidized due to a trace amount of oxygen that is inevitably contained in the compact during the production process, and the thermosetting resin composition is likely to deteriorate. Furthermore, in order to suppress oxidation of the metal powder and deterioration of the thermosetting resin composition, the time for keeping the above-described thermal treatment temperature may be several minutes or longer and 4 hours or shorter, and preferably 15 minutes or longer and 3 hours or shorter.

The present invention is not necessarily limited to the aforementioned embodiments. Various modifications of the present invention are possible without departing from the gist of the present invention, and these modified examples are also included in the present invention.

EXAMPLES

The present invention will be described in detail with reference to the following Examples and Comparative Examples. The present invention is not limited by the following Examples.

Example 1

Dicyclopentanyl methacrylate ("FA-513M" manufactured by Showa Denko Materials Co., Ltd.), glycidyl methacrylate ("Light Ester G" manufactured by Kyoeisha Chemical Co., Ltd.), 2-hydroxyethyl methacrylate (product manufactured by FUJIFILM Wako Pure Chemical Corporation), dodecyl methacrylate (product manufactured by FUJIFILM Wako Pure Chemical Corporation), pentaerythritol tetraacrylate ("EBECRYL 40" manufactured by Daicel Corporation), and t-butylperoxy-2-ethylhexanoate ("PERBUTYL O" manufactured by NOF CORPORATION) were mixed in plastic bottle at room temperature to prepare a monomer composition of Example 1. The monomer composition was liquid at room temperature. The mass of each component constituting the monomer composition is shown in Table 1 below. The volume of the plastic bottle was 250 ml.

The viscosity of the monomer composition of Example 1 was measured at 25° C. Rheometer MCR301 manufactured by Anton Paar GmbH was used for viscosity measurement. The viscosities of the monomer compositions are shown in Table 1 below.

A porous compact of Example 1 was prepared by compression molding of a compound containing a metal powder and a thermosetting resin composition and heating (curing the thermosetting resin composition). As the metal powder, an Nd—Fe—B-based alloy powder was used. The Nd—Fe—B-based alloy powder was MQP-B manufactured by Magnequench International, LLC. The average particle size of the Nd—Fe—B-based alloy powder was 100 μm. The thermosetting resin composition contained an epoxy resin and a phenolic resin. The compact was ring-shaped (cylindrical). The dimension of the compact was outer diameter 25 mm×inner diameter 21 mm×thickness 3 mm. The content of the metal powder in the compact is shown in Table 1 below. The content of the metal powder in the compact means the ratio of the mass of the metal powder with respect to the total mass of the metal powder and the thermosetting resin composition.

The volume of the compact was calculated from the dimension of the porous compact. The mass of the porous compact was measured with an electronic balance. The density of the porous compact was calculated by dividing the mass of the compact by the volume of the compact. The density of the porous compact of Example 1 is shown in Table 1 below.

The monomer composition was impregnated in the voids of the porous compact by the following method.

A mass $M_A$ of the porous compact was measured before impregnation with the monomer composition. The porous compact and the monomer composition were placed in a square-shaped container made of stainless steel, and the entire porous compact was immersed in the monomer composition. The square-shaped container in which the compact and the monomer composition had been contained was placed in a vacuum desiccator. The inside of the vacuum desiccator was gradually depressurized with a vacuum pump. The inside of the vacuum desiccator was depressurized until no air bubbles were observed from the compact due to depressurization, and then the vacuum desiccator was left for 30 minutes. After 30 minutes, the inside of the vacuum desiccator was gradually opened to the atmosphere, and the pressure inside the vacuum desiccator returned to normal pressure in about 30 minutes. The compact was removed from the monomer composition, the monomer composition adhering to the surface of the compact was wiped off, and the compact was placed on a polytetrafluoroethylene sheet. The monomer composition impregnated in the compact was polymerized by heating the compact at 90° C. for 1 hour in an explosion-proof thermostat bath. Thereafter, the compact was further heated at 180° C. for 30 minutes. A product of ESPEC Corp. was used as the explosion-proof thermostat bath.

By the above method, a compact containing a polymer of the monomer composition (an acrylic resin having cyclic cross linking structures) was obtained. A mass $M_B$ of the compact containing the acrylic resin having cyclic cross linking structures was measured. The impregnation amount Rm of the monomer composition defined by Mathematical Formula 1 below was calculated. The impregnation amount Rm of the monomer composition of Example 1 is shown in Table 1 below.

$$Rm=(M_B-M_A)-M_B\times 100 \quad (1)$$

The radial crushing strength of the compact containing the acrylic resin having cyclic cross linking structures was measured by the following method.

Using a universal compressive tester, the compression pressure was applied to the side surface of the compact in a direction perpendicular to the central axis of the ring-shaped compact. The compression pressure at which the compact was destroyed was measured by increasing the compression pressure. The compression pressure at which the compact was destroyed means the radial crushing strength (unit: MPa). AG-10TBR manufactured by SHIMADZU CORPORATION was used as the universal compressive tester. The speed of the cross head in the crushing strength measurement was 1 mm/min. The radial crushing strength in air at room temperature (25° C.) and the radial crushing strength in air at 150° C. were measured. The radial crushing strength of Example 1 is shown in Table 1 below.

Examples 2 to 9 and Comparative Examples 1 to 5

In the preparation of the monomer composition of Example 4, dicyclopentenyl acrylate ("FA-511A" manufactured by Showa Denko Materials Co., Ltd.) was used instead of dicyclopentanyl methacrylate (FA-513M).

In the preparation of the monomer composition of Example 5, dicyclopentenyloxyethyl methacrylate ("FA-512MT" manufactured by Showa Denko Materials Co., Ltd.) was used instead of dicyclopentanyl methacrylate (FA-513M).

In Comparative Examples 1 to 3, their monomer compositions were not prepared.

In the preparation of the monomer composition of each of Comparative Examples 4 and 5, none of FA-513M, FA-511A, and FA-512MT was used. That is, the monomer composition of each of Comparative Examples 4 and 5 did not contain a (meth)acrylate having a cyclic cross linking structure.

The monomer composition of Comparative Example 4 was a mixture consisting of 2-hydroxyethyl methacrylate, methyl methacrylate, dodecyl methacrylate, pentaerythritol tetraacrylate, and t-butylperoxy-2-ethylhexanoate.

The monomer composition of Comparative Example 5 was a mixture consisting of methyl methacrylate, dodecyl methacrylate, pentaerythritol tetraacrylate, and t-butylperoxy-2-ethylhexanoate.

The mass of each component constituting the monomer composition of each of Examples 2 to 9 and Comparative Examples 4 and 5 is shown in Table 1 below.

The monomer composition of each of Examples 2 to 9 and Comparative Examples 4 and 5 was prepared by the same method as in Example 1 except for the above items. The viscosity of the monomer composition of each of Examples 2 to 9 and Comparative Examples 4 and 5 was measured by the same method as in Example 1. The viscosity of the monomer composition of each of Examples 2 to 9 and Comparative Examples 4 and 5 is shown in Table 1 below.

In the preparation of the porous compact of each of Examples 7 to 9 and Comparative Examples 3 and 5, as the metal powder, a pure iron powder was used instead of the Nd—Fe—B-based alloy powder. As the pure iron powder, a product (Somaloy 500H) manufactured by Höganäs AB was used. The average particle size of the pure iron powder was 75 μm. The dimension of the ring-shaped compact of each of Examples 7 to 9 and Comparative Examples 3 and 5 was outer diameter 30 mm×inner diameter 20 mm×thickness 5 mm.

The content of the metal powder in the porous compact of each of Examples 2 to 9 and Comparative Examples 1 to 5 is shown in Table 1.

The porous compact of each of Examples 2 to 9 and Comparative Examples 1 to 5 was prepared by the same method as in Example 1 except for the above items. The density of the porous compact of each of Examples 2 to 9 and Comparative Examples 1 to 5 was measured by the same method as in Example 1. The density of the porous compact of each of Examples 2 to 9 and Comparative Examples 1 to 5 is shown in Table 1 below.

The compact of each of Examples 2 to 9 and Comparative Examples 4 and 5, containing a polymer of the monomer composition, was obtained by the same method as in Example 1 except for the above items. The impregnation amount Rm of the monomer composition of each of Examples 2 to 9 and Comparative Examples 4 and 5 was measured by the same method as in Example 1. The impregnation amount Rm of the monomer composition of each of Examples 2 to 9 and Comparative Examples 4 and 5 is shown in Table 1 below. The radial crushing strength of the porous compact of each of Examples 2 to 9 and Comparative Examples 1 to 5 was measured by the same method as in Example 1. However, the radial crushing strength of the compact of each of Comparative Examples 1 to 3 means the radial crushing strength of the porous compact that is not impregnated with the monomer composition. The radial crushing strength of the compact of each of Examples 2 to 9 and Comparative Examples 1 to 5 is shown in Table 1 below.

TABLE 1

| | | Example | | | | | | |
|---|---|---|---|---|---|---|---|---|
| | Unit | 1 | 2 | 3 | 4 | 5 | 6 | 7 |
| FA-513M | g | 180 | 210 | 220 | — | — | 180 | 180 |
| FA-511A | g | — | — | — | 180 | — | — | — |
| FA-512MT | g | — | — | — | — | 180 | — | — |
| Glycidyl methacrylate | g | 15 | 15 | 15 | 15 | 15 | 15 | 15 |
| 2-Hydroxyethyl methacrylate | g | 15 | 15 | 15 | 15 | 15 | 15 | 15 |
| Methyl methacrylate | g | — | — | — | — | — | — | — |
| Dodecyl methacrylate | g | 60 | 30 | 30 | 60 | 60 | 60 | 60 |
| EBECRYL 40 | g | 30 | 30 | 20 | 30 | 30 | 30 | 30 |
| PERBUTYL O | g | 3 | 3 | 3 | 3 | 3 | 3 | 3 |
| Viscosity of monomer composition | mPa · s | 60 | 61 | 44 | 59 | 56 | 60 | 60 |
| Metal powder | — | NdFeB | NdFeB | NdFeB | NdFeB | NdFeB | NdFeB | Fe |
| Content of metal powder | % by mass | 96.9 | 96.9 | 96.9 | 96.9 | 96.9 | 98.0 | 99.0 |
| Density of compact | $g/cm^3$ | 5.69 | 5.69 | 5.69 | 5.69 | 5.69 | 6.18 | 7.03 |
| Impregnation amount Rm of monomer composition | % by mass | 1.0 | 1.1 | 1.1 | 1.0 | 1.0 | 1.3 | 0.57 |

TABLE 1-continued

| | | | | | | | | |
|---|---|---|---|---|---|---|---|---|
| Radial crushing strength at room temperature | MPa | 78.5 | 78.8 | 78.9 | 78.4 | 79.1 | 93.6 | 94.0 |
| Radial crushing strength at 150° C. | MPa | 57.8 | 60.2 | 60.7 | 59.2 | 62.0 | 57.8 | 70.7 |

| | Example | | Comparative Example | | | | |
|---|---|---|---|---|---|---|---|
| | 8 | 9 | 1 | 2 | 3 | 4 | 5 |
| FA-513M | 210 | 195 | — | — | — | — | — |
| FA-511A | — | — | — | — | — | — | — |
| FA-512MT | — | — | — | — | — | — | — |
| Glycidyl methacrylate | 15 | 15 | — | — | — | — | — |
| 2-Hydroxyethyl methacrylate | 15 | 15 | — | — | — | 20 | — |
| Methyl methacrylate | — | — | — | — | — | 120 | 40 |
| Dodecyl methacrylate | 30 | 30 | — | — | — | 40 | 100 |
| EBECRYL 40 | 30 | 45 | — | — | — | 20 | 10 |
| PERBUTYL O | 3 | 3 | — | — | — | 2 | 1.5 |
| Viscosity of monomer composition | 61 | 87 | — | — | — | 54 | 37 |
| Metal powder | Fe | Fe | NdFeB | NdFeB | Fe | NdFeB | Fe |
| Content of metal powder | 99.0 | 99.0 | 96.9 | 99.0 | 99.0 | 96.9 | 99.0 |
| Density of compact | 7.3 | 7.3 | 5.69 | 6.18 | 7.3 | 5.69 | 7.3 |
| Impregnation amount Rm of monomer composition | 0.58 | 0.62 | — | — | — | 0.23 | 0.56 |
| Radial crushing strength at room temperature | 91.6 | 91.7 | 59.1 | 51.7 | 76.4 | 72.5 | 72.0 |
| Radial crushing strength at 150° C. | 65.6 | 70.6 | 54.0 | 31.8 | 60.0 | 54.2 | 60.0 |

Examples 1 to 6 and Comparative Examples 1, 2, and 4 having a common metal powder composition were compared. The radial crushing strength at 25° C. of each of Examples 1 to 6 was higher than the radial crushing strength at 25° C. of each of Comparative Examples 1, 2, and 4. The radial crushing strength at 150° C. of each of Examples 1 to 6 was higher than the radial crushing strength at 150° C. of each of Comparative Examples 1, 2, and 4.

Examples 7 to 9 and Comparative Examples 3 and 5 having a common metal powder composition were compared. The radial crushing strength at 25° C. of each of Examples 7 to 9 was higher than the radial crushing strength at 25° C. of each of Comparative Examples 3 and 5. The radial crushing strength at 150° C. of each of Examples 7 to 9 was higher than the radial crushing strength at 150° C. of each of Comparative Examples 3 and 5.

INDUSTRIAL APPLICABILITY

For example, the monomer composition according to one aspect of the present invention is used as a raw material for a bonded magnet or a dust core.

REFERENCE SIGNS LIST

1: metal particle constituting metal powder, 2: thermosetting resin composition, 3: void, 4A: monomer composition, 4B: resin having cyclic cross linking structure (polymer of monomer composition), 10A: porous compact, 10B: compact that is impregnated with monomer composition (compact containing resin having cyclic cross linking structure).

The invention claimed is:

1. A compact comprising:

a metal powder;

a thermosetting resin composition; and a resin having at least one structure of a dicyclopentane structure and a dicyclopentene structure.

2. The compact according to claim 1, further comprising an acrylic resin having a glycidyl group.

3. The compact according to claim 1, further comprising an acrylic resin having a hydroxyl group.

4. The compact according to claim 1, wherein the resin having at least one structure of the dicyclopentane structure and the dicyclopentene structure is an acrylic resin.

5. The compact according to claim 1, wherein the resin having at least one structure of the dicyclopentane structure and the dicyclopentene structure further has at least one functional group of a glycidyl group and a hydroxyl group.

6. The compact according to claim 1, wherein the resin having at least one structure of the dicyclopentane structure and the dicyclopentene structure has a crosslinked structure including —CH(OH)—$CH_2$—.

7. The compact according to claim 6, wherein the resin having at least one structure of the dicyclopentane structure and the dicyclopentene structure is bonded to the thermosetting resin composition via the crosslinked structure.

8. The compact according to claim 5, wherein the metal powder is a permanent magnet or a soft magnetic material.

9. A bonded magnet comprising the compact according to claim 1, wherein the metal powder is at least one of a Sm—Fe—N-based magnet and a Nd—Fe—B-based magnet.

10. A dust core comprising the compact according to claim 1, wherein the metal powder is at least one of a pure iron and an alloy containing iron.

* * * * *